US012793370B2

(12) United States Patent
Chiu et al.

(10) Patent No.: US 12,793,370 B2

(45) Date of Patent: Nov. 10, 2026

(54) DYNAMIC CLOTHING ADJUSTMENT SYSTEM BASED ON MUSICAL ELEMENT AND METHOD THEREOF

(71) Applicants: SQ Technology (Shanghai) Corporation, Shanghai (CN); Inventec Corporation, Taipei (TW)

(72) Inventors: Chuan-Cheng Chiu, Taipei (TW); Miao-Miao Liu, Shanghai (CN)

(73) Assignees: SQ Technology (Shanghai) Corporation, Shanghai (CN); Inventec Corporation, Taipei City (TW)

( * ) Notice: Subject to any disclaimer, the term of this patent is extended or adjusted under 35 U.S.C. 154(b) by 115 days.

(21) Appl. No.: 19/021,156

(22) Filed: Jan. 15, 2025

(65) Prior Publication Data

US 2026/0127835 A1 May 7, 2026

(30) Foreign Application Priority Data

Nov. 7, 2024 (CN) ......................... 202411587233.6

(51) Int. Cl.
*G06T 19/20* (2011.01)
*G06T 13/40* (2011.01)
*G10L 25/57* (2013.01)

(52) U.S. Cl.
CPC .............. *G06T 19/20* (2013.01); *G06T 13/40* (2013.01); *G06T 2210/16* (2013.01); *G06T 2219/2024* (2013.01); *G10L 25/57* (2013.01)

(58) Field of Classification Search
None
See application file for complete search history.

(56) References Cited

U.S. PATENT DOCUMENTS 12,670,643 B2 * 6/2026 Berger .................. G06T 19/006
2018/0350148 A1 * 12/2018 George ................ G09B 19/003
2022/0398937 A1 * 12/2022 Furuya .................... G06F 3/016

FOREIGN PATENT DOCUMENTS

WO WO-2020079235 A1 * 4/2020 ............. G06Q 30/06

* cited by examiner

*Primary Examiner* — James A Thompson

(57) ABSTRACT

A dynamic clothing adjustment system based on musical element and a method thereof are disclosed. In the system, clothing items and first musical element messages, and a pre-trained musical element recognition model are stored; a computer host generates a virtual character that is allowed to wear the clothing item for display, and when a musical performance is detected, a music signal is continuously received, the music signal is input into a musical element recognition model to obtain a second musical element message corresponding to the music signal; the hardware processor loads the clothing item to be worn on the virtual character based on a comparison result of the first musical element message and the second musical element message, and continuously compares a difference between the second musical element messages at different times; when the difference exceeds a preset value, the clothing item worn on the virtual character is adjusted.

10 Claims, 5 Drawing Sheets

DYNAMIC CLOTHING ADJUSTMENT SYSTEM BASED ON MUSICAL ELEMENT AND METHOD THEREOF

BACKGROUND OF THE INVENTION

1. Field of the Invention

The present invention relates to a dynamic clothing adjustment system and a method thereof, and more particularly to a dynamic clothing adjustment system based on musical element and a method thereof.

2. Description of the Related Art

In recent years, with the popularization and rapid development of virtual technologies, various applications of virtual technologies have emerged, such as virtual singers and virtual streamers (such as VTubers).

Conventionally, clothing on virtual singers or virtual streamers are usually fixed and unchanging. Even if clothing on virtual singers or virtual streamers can be changed, different types of clothing are switched through pre-configured way and cannot adapt to the music during a performance. In other words, while conventional methods maintain consistent images of virtual singers or virtual streamers, they often lack interaction with the music, and it may cause the problem that the clothing on virtual singers or virtual streamers cannot adapt to musical changes.

In view of this, some companies have proposed technical solutions of changing the colors and patterns of the virtual character's clothing, LED light clothing, so that the displayed colors and patterns of the clothing can be dynamic adjusted according to the music, thereby enhancing the visual appeal of the virtual character. However, this solution cannot instantly achieve sufficient coordination between the clothing and the music, that is, simply changing colors and patterns is still insufficient for the audience to perceive coordination between the music and clothing. The patterns and colors, if disorganized, may even amplify the sense of discord. Thus, although the clothing on a virtual character can be changed with the music, the problem of insufficient coordination remains.

According to above-mentioned contents, what is needed is to develop an improved solution to solve the problem of insufficient real-time coordination between music and clothing on a virtual character.

SUMMARY OF THE INVENTION

An objective of the present invention is to disclose a dynamic clothing adjustment system based on musical element and a method thereto, to solve the conventional problem of insufficient real-time coordination between music and clothing on a virtual character.

To achieve the objective, the present invention discloses a dynamic clothing adjustment system based on musical element, the system includes a clothing database and a computer host. The clothing database is configured to store clothing items and first musical element messages, wherein each of the first musical element messages corresponds to one of the clothing items. The computer host is configured to connect the clothing database and comprises a non-transitory computer-readable storage medium and a hardware processor. The non-transitory computer-readable storage medium is configured to store computer readable instructions, a pre-trained musical element recognition model, wherein the musical element recognition model is configured to receive a music signal, and output at least one second musical element message corresponding to the music signal. The hardware processor is electrically connected to the non-transitory computer-readable storage medium, and configured to execute the computer readable instructions to operate: generating a virtual character through 3D modeling technology and displaying the virtual character, wherein the virtual character is allowed to wear one of the clothing items; when detecting that the virtual character performs a musical performance, continuously receiving a music signal and performing feature extraction, standardization and dimensionality reduction processing on the music signal, and inputting the processed music signal into the musical element recognition model to obtain the second musical element message corresponding to the music signal; comparing the obtained second musical element message with the first musical element message in the clothing database, and loading one of the clothing items corresponding to the matching first musical element message and wearing the loaded clothing item on the virtual character; continuously comparing a difference between the second musical element messages obtained at different times to obtain an difference element amount, when the difference element amount exceeds an preset amount, repeating the previous steps to replace the clothing item currently worn on the virtual character with the loaded clothing item, and during the process of wearing the loaded clothing item, generating an dress-change special effects to obscure the virtual character until the clothing item is worn is completed.

The present invention discloses a dynamic clothing adjustment method based on musical element, the dynamic clothing adjustment method includes steps of connecting a clothing database to a computer host, wherein the clothing database stores clothing items and first musical element messages, each of the clothing items corresponds to one of the first musical element messages, and the computer host stores a pre-trained musical element recognition model, the musical element recognition model receives a music signal and outputs at least one second musical element message corresponding to the music signal; generating a virtual character through a 3D modeling technology and displaying the virtual character, by the computer host, wherein the virtual character is allowed to wear at least one of the clothing items; when it is detected that the virtual character performs a musical performance, continuously receiving a music signal, performing feature extraction, standardization and dimensionality reduction processing on the music signal, and inputting the processed music signal into the musical element recognition model to obtain the second musical element message corresponding to the music signal, by the computer host; comparing the obtained second musical element message with the first musical element message in the clothing database, and loading one of the clothing items corresponding to the matching first musical element message and wearing the loaded clothing item on the virtual character, by the computer host; continuously comparing a difference between the second musical element messages obtained at different times to obtain an difference element amount, and when the difference element amount exceeds an preset amount, repeating the previous steps to replace the clothing item currently worn on the virtual character with the loaded clothing item, by the computer host, wherein during the process of wearing the clothing item, a dress-change special effects is generated to obscure the virtual character until the clothing item is worn completely.

According to the above-mentioned system and method of the present invention, the difference between the present invention and the conventional technology is that, in the present invention, the clothing items and corresponding first musical element messages are stored, the pre-trained musical element recognition model is stored; initially, the computer host generates a virtual character that is allowed to wear the clothing item for display, and when the musical performance is detected, the music signal is continuously received, the music signal is input into the musical element recognition model to obtain the second musical element message corresponding to the music signal; the hardware processor loads the clothing item to be worn on the virtual character based on the comparison result of the first musical element message and the second musical element message, and continuously compares the difference between the second musical element messages at different times; when the difference exceeds the preset value, the clothing item worn on the virtual character is adjusted.

Therefore, the above-mentioned solution of the present invention can achieve the technical effect of improving the coordination between the music and the virtual character's clothing.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
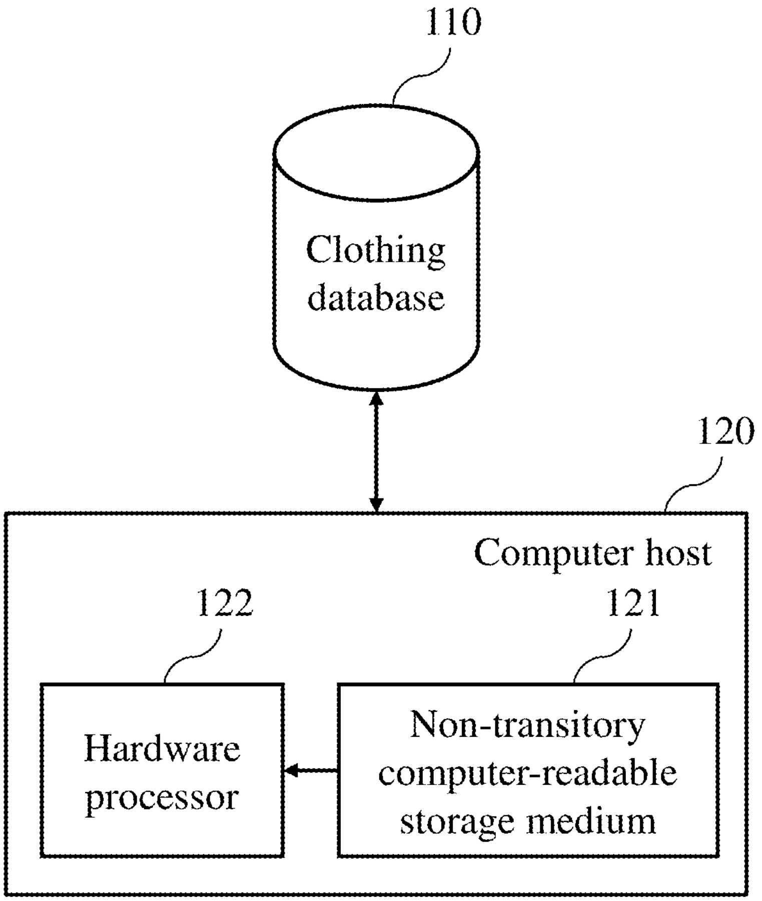
FIG. 1 is a block diagram of a dynamic clothing adjustment system based on musical element, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions, and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first,' 'second,' 'third,' and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on", "connected to" or "coupled to" another element or layer, it can be directly on, connected or coupled to the other element or layer, or intervening elements or layers may be present. In contrast, when an element is referred to as being "directly on", "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIG. 1. FIG. 1 is a block diagram of a dynamic clothing adjustment system based on musical element, according to the present invention. As shown in FIG. 1, the dynamic clothing adjustment system includes a clothing database 110 and a computer host 120. The clothing database 110 is configured to store clothing items and first musical element messages, and each of the clothing items corresponds to one of the first musical element messages. In practical implementation, the first musical element message includes at least one of genre, rhythm, melody, harmony, and timbre, and selectively includes an ethnic religious message as a condition for selecting and loading the clothing item. The first musical element message can be stored in structured document formats such as JSON or XML.

The computer host 120 is connected to the clothing database 110, and the computer host 120 includes a non-transitory computer-readable storage medium 121 and a hardware processor 122. The non-transitory computer-readable storage medium 121 is configured to store computer readable instructions and a pre-trained musical element recognition model. The musical element recognition model allows input of a music signal, and outputs second musical element message corresponding to the music signal. In actual implementation, the non-transitory computer-readable storage medium 121 may include a hard disk, an optical disk, a flash memory, or the like. The computer readable instructions can be executed by the hardware processor 122 of the computer host 120. The computer readable instructions can be assembly language instructions, instruction-set-structure instructions, machine instructions, machine-related Instructions, micro-instructions, firmware instructions, or source codes or object codes written in any combination of one or more programming languages. The programming language includes object-oriented programming languages, such as: Common Lisp, Python, C++, Objective-C, Smalltalk, Delphi, Java, Swift, C #, Perl, Ruby, or PHP; the programming language can include regular procedural programming languages, such as C language or similar programming languages. It is particularly noted that the second musical element message is similar to the first musical element message with the only difference being that the second musical element message is outputted by a musical element recognition model and the first musical element message is pre-stored in a clothing database 110. Additionally, the musical element recognition model can be trained using one or more machine learning models such as convolutional neural networks (CNN), recurrent neural networks (RNN), generative adversarial networks (GAN), deep learning (DL), and reinforcement learning (RL).

The hardware processor 122 is electrically connected to the non-transitory computer-readable storage medium 121, and configured to execute the computer readable instruction, perform the following operations. Initially, the hardware processor 122 generates a virtual character through 3D modeling technology and displays the virtual character. The virtual character is allowed to wear one of the clothing items. When the hardware processor 122 detects that the virtual character performs a musical performance, the hardware processor 122 continuously receives a music signal and performs feature extraction, standardization and dimensionality reduction processing on the music signal, and inputs the processed music signal into the musical element recognition model to obtain the second musical element message corresponding to the music signal. The hardware processor 122 compares the obtained second musical element message with the first musical element message in the clothing database and loads one of the clothing items corresponding to the matching first musical element message and wearing the loaded clothing item on the virtual character. The hardware processor 122 continuously compares a difference between the second musical element messages obtained at different times to obtain an difference element amount, and when the difference element amount exceeds an preset amount, the hardware processor 122 repeats the previous steps to replace the clothing item currently worn on the virtual character with the loaded clothing item, wherein during the process of wearing the loaded clothing item, the hardware processor 122 generates an dress-change special effects to obscure the virtual character until the clothing item is worn completed. In practical implementation, initially, the hardware processor 122 can load multiple pieces of music data and label messages as training data, each of the label messages corresponding to one of the pieces of music data from the music database, and the hardware processor 122 can input the training data into an artificial intelligence model for training, to generate the musical element recognition model. The label message can include at least one of genre, rhythm, melody, harmony, and timbre, and can also include an ethnic religious message, such as religious hymns or traditional music of specific cultures. In an embodiment, the hardware processor 122 can detect an IP address, and when the IP address matches a specific country (e.g., a pre-specified country), the hardware processor 122 can load at least one accessory item from the clothing database and wear the loaded accessory item on the virtual character, to ensure the clothing on the virtual character aligns with the requirements or aesthetics of the specific country. The accessory item can include at least one of a turban, a veil, a scarf, a mask, and a hat. Additionally, the hardware processor 122 is allowed to continuously capture images of the virtual character and share the captured images to social media. When the difference element amount does not exceed the preset amount, any of the loaded clothing items is allowed to be selected for wearing on the virtual character.

It is to be particularly noted that, in actual implementation, the above-mentioned solution of the present invention can be implemented fully or partly based on hardware, for example, the hardware processor 122 of the system can be implemented by integrated circuit chip, system on chip (SoC), a complex programmable logic device (CPLD), or a field programmable gate array (FPGA). The non-transitory computer-readable storage medium 121 of the present invention records computer readable program instructions, and the hardware processor 122 can execute the computer readable program instructions to implement concepts of the present invention. The non-transitory computer-readable storage medium 121 can be a tangible apparatus for holding and storing the instructions executable of an instruction executing apparatus. The non-transitory computer-readable storage medium 121 can be, but not limited to electronic storage apparatus, magnetic storage apparatus, optical storage apparatus, electromagnetic storage apparatus, semiconductor storage apparatus, or any appropriate combination thereof. More particularly, the non-transitory computer-readable storage medium 121 can include a hard disk, an RAM memory, a read-only-memory, a flash memory, an optical disk, a floppy disc, or any appropriate combination thereof, but this exemplary list is not an exhaustive list. The non-transitory computer-readable storage medium 121 is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the non-transitory computer-readable storage medium 121 to each calculating/processing apparatus, or downloaded through network, such as internet network, local area network, wide area network and/or wireless network, to external computer equipment or external storage apparatus. The blockchain network 130 includes copper transmission cable, fiber transmission, wireless transmission, router, firewall, switch, hub and/or gateway. The network card or network interface of each calculating/processing apparatus can receive the computer readable program instructions from network and forward the computer readable program instruction to store in non-transitory computer-readable storage medium 121 of each calculating/processing apparatus.

Figure 2A:
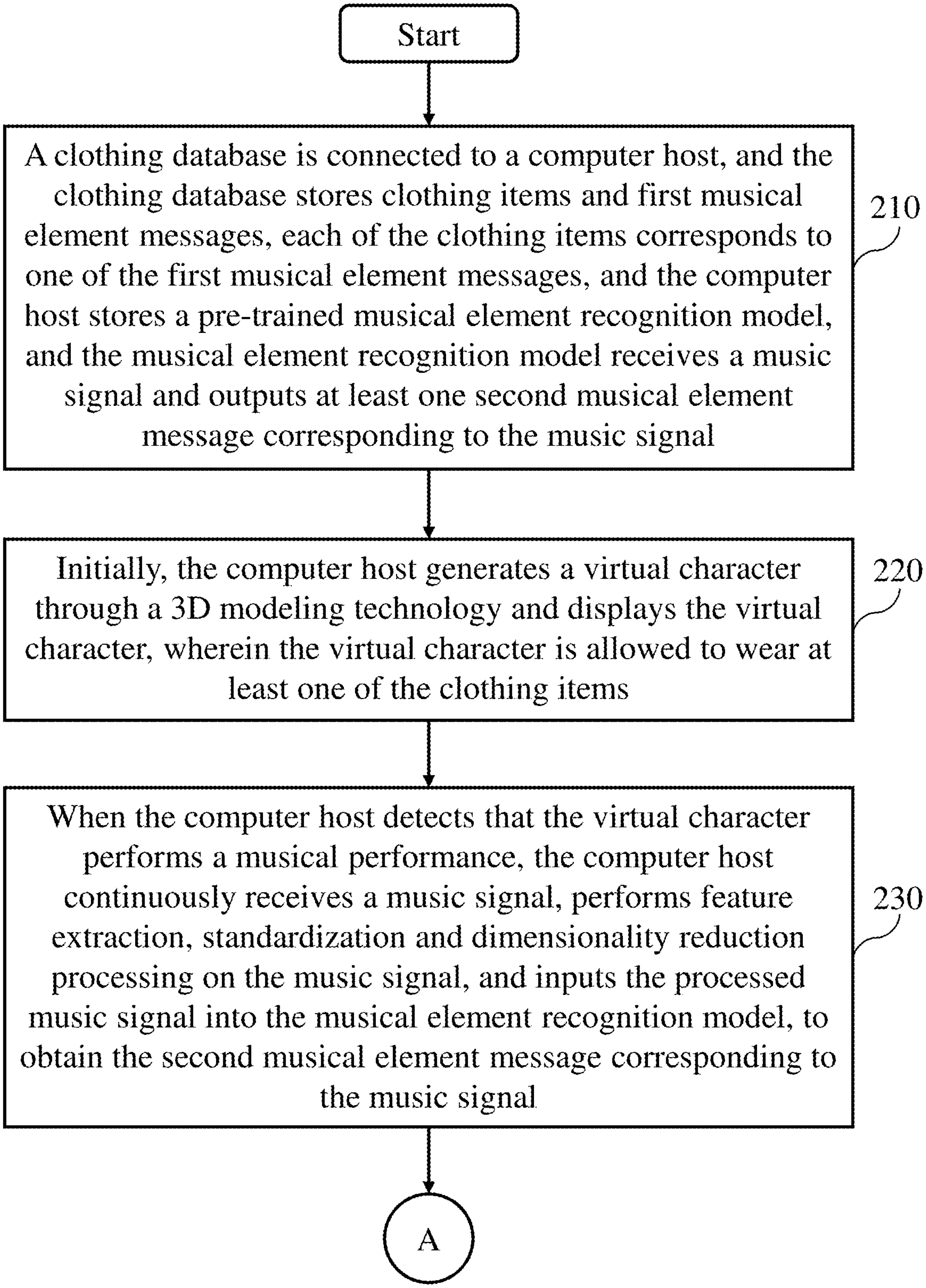
FIG. 2A and FIG. 2B are flowcharts of a dynamic clothing adjustment method based on musical element, according to the present invention.
Figure 2B:
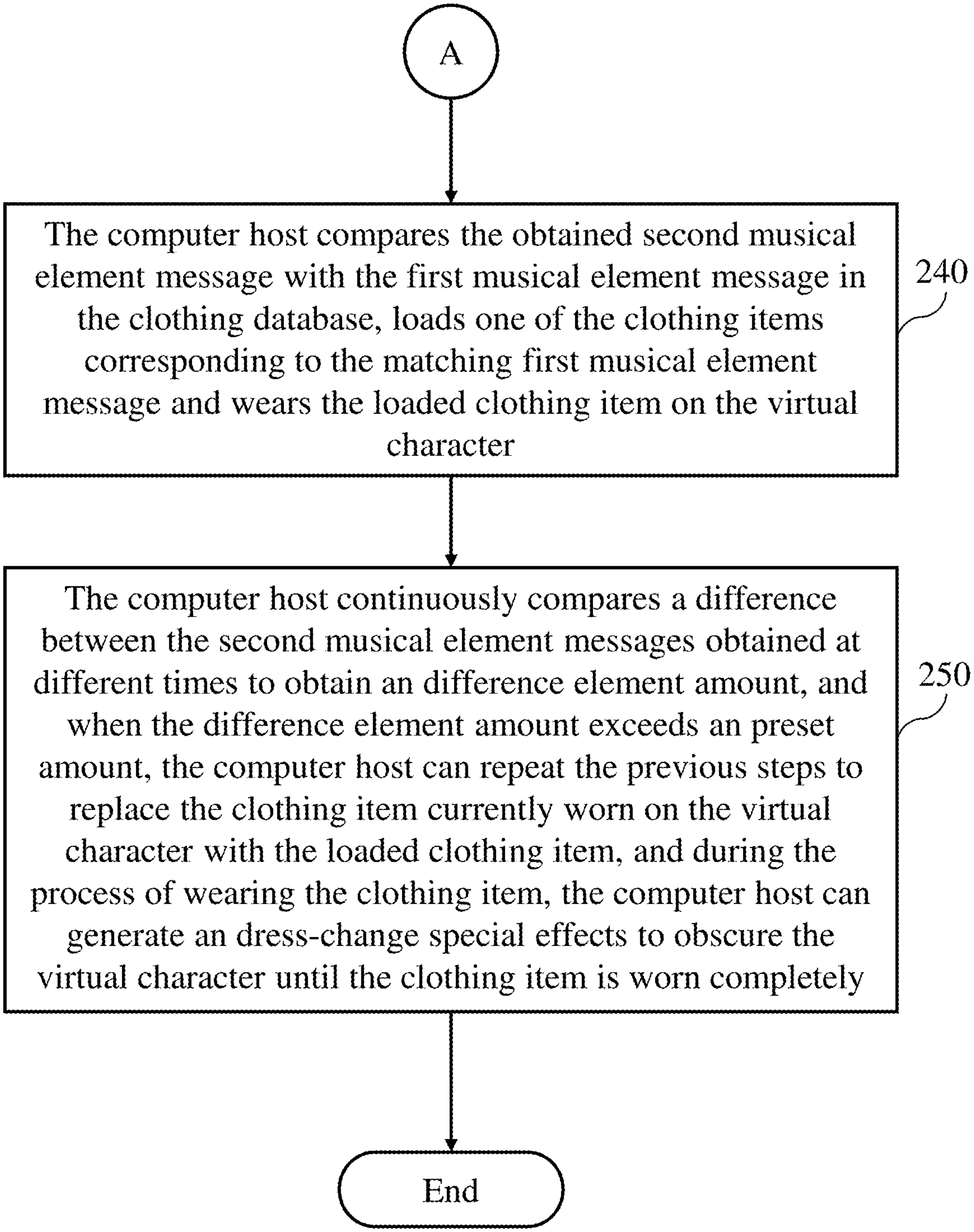

Please refer to FIG. 2A and FIG. 2B. FIG. 2A and FIG. 2B are flowcharts of a dynamic clothing adjustment method based on musical element, according to the present invention. As shown in FIG. 2A and FIG. 2B, the dynamic clothing adjustment method includes the following steps. In a step 210, a clothing database is connected to a computer host, and the clothing database stores clothing items and first musical element messages, each of the clothing items corresponds to one of the first musical element messages, and the computer host stores a pre-trained musical element recognition model, and the musical element recognition model receives a music signal and outputs at least one second musical element message corresponding to the music signal. In a step 220, initially, the computer host 120 generates a virtual character through a 3D modeling technology and displays the virtual character, wherein the virtual character is allowed to wear at least one of the clothing items. In a step 230, when the computer host 120 detects that the virtual character performs a musical performance, the computer host 120 continuously receives a music signal, performs feature extraction, standardization and dimensionality reduction processing on the music signal, and inputs the processed music signal into the musical element recognition model, to obtain the second musical element message corresponding to the music signal. In a step 240, the computer host 120 compares the obtained second musical element message with the first musical element message in the clothing database, loads one of the clothing items corresponding to the matching first musical element message and wears the loaded clothing item on the virtual character. In a step 250, the computer host 120 continuously compares a difference between the second musical element messages obtained at different times to obtain an difference element amount, and when the difference element amount exceeds an preset amount, the computer host 120 can repeat the previous steps to replace the clothing item currently worn on the virtual character with the loaded clothing item, and during the process of wearing the clothing item, the computer host 120 can generate an dress-change special effects to obscure the virtual character until the clothing item is worn completely. Through aforementioned steps, the clothing items and the corresponding first musical element messages are stored, the pre-trained musical element recognition model is stored; initially, the computer host generates the virtual character that is allowed to wear the clothing item for display, and when the musical performance is detected, the music signal is continuously received, the music signal is input into the musical element recognition model to obtain the second musical element message corresponding to the music signal; the hardware processor loads the clothing item to be worn on the virtual character based on the comparison result of the first musical element message and the second musical element message, and continuously compares the difference between the second musical element messages at different times; when the difference exceeds a preset value, the clothing item worn on the virtual character is adjusted.

Figure 3:
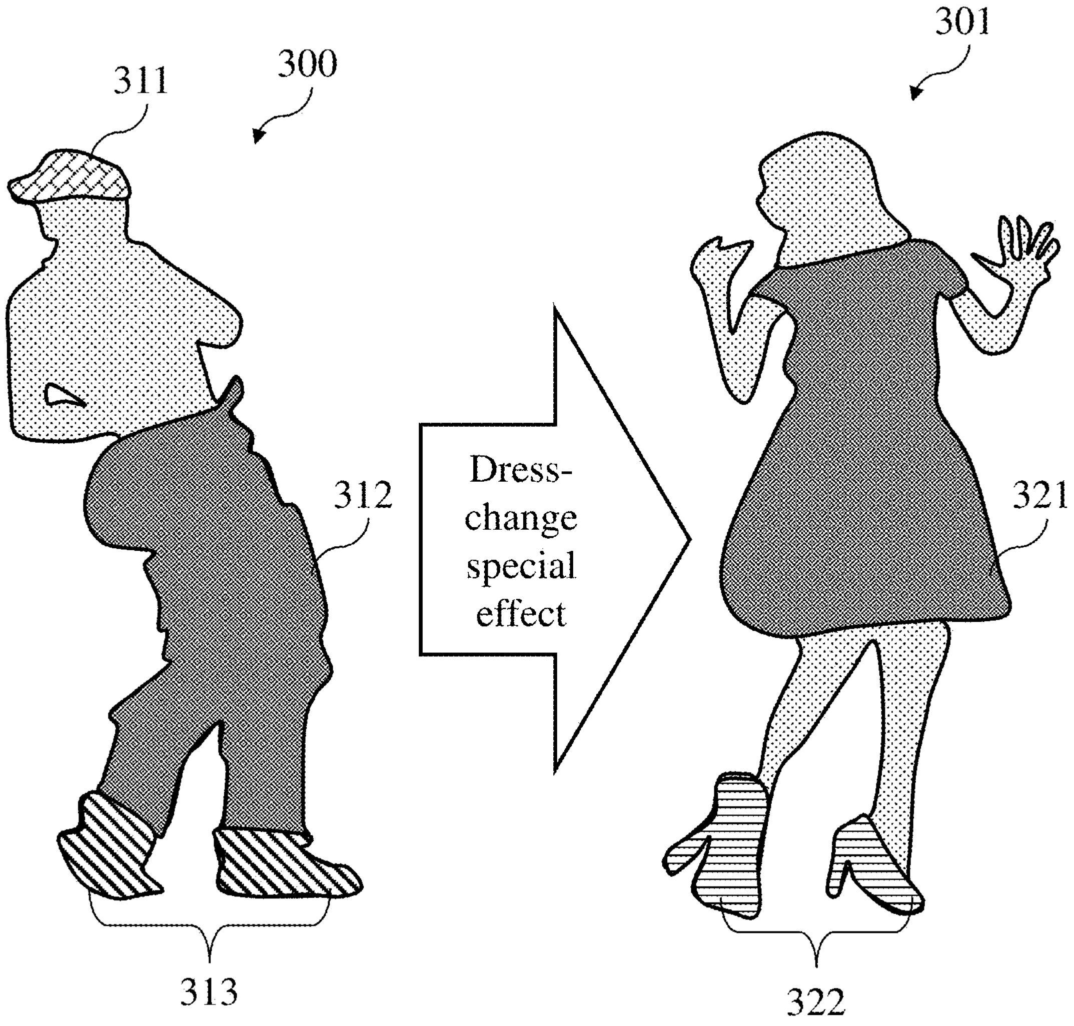
FIG. 3 is a schematic view of an operation of dynamically adjusting clothing of a virtual character based on musical element, according to an application of the present invention.

An embodiment of the present invention will be illustrated in the following paragraphs with reference to FIG. 3 and FIG. 4. Please refer to FIG. 3. FIG. 3 is a schematic view of an operation of dynamically adjusting clothing of a virtual character based on a musical element, according to an application of the present invention. The computer host 120 generates a virtual character 300, which is allowed wearing a clothing item, through 3D modeling technology, and displays the virtual character 300. When the computer host 120 detects that virtual character 300 is performing a musical performance, the computer host 120 continuously receives a music signal for preprocessing, such as feature extraction, standardization and dimensionality reduction processing, and inputs the processed music signal into the musical element recognition model to obtain the second musical element message corresponding to the music signal. In a condition that the second musical element message output by a musical element recognition model is "genre: rock music", it indicates that the genre of the music signal is rock. Next, the computer host 120 compares the second musical element message with the first musical element message in the clothing database 110, and loads the clothing item corresponding to the matched first musical element message; in this case, the first musical element message is "genre: rock music", the clothing item can be, for example, a hat 311, a jeans 312, and a sneakers 313, and the clothing item are worn on the virtual character 300. Then, the computer host 120 continues comparing the second musical element message obtained at different time points (e.g., the time points segmented by a fixed interval of seconds or minutes, or the time points segmented by music beats), to obtain a difference element amount; for example, in a condition that the previously obtained second musical element message is "genre: rock; rhythm: quarter note", and the newly obtained second musical element message is "genre: lyrical; rhythm: triple meter". Since both genre and rhythm of the two second musical element messages are different from each other, the difference element amount equals 2. When the difference element amount exceeds a preset amount (e.g., a value 1), the computer host 120 compares the newly obtained second music element "genre: lyrical; rhythm: triple meter" with the first musical element message in the clothing database 110, and loads the corresponding clothing items (such as a woman's dress 321 and a high heels 322) to replace the current clothing items worn on virtual character 300 (such as the hat 311, the jeans 312, and the sneakers 313), to form the virtual character 301 as shown in FIG. 3. Suring the process of wearing the clothing items, a dress-change special effect can be applied to obscure the original virtual character 300 until the new clothing items (i.e., the woman's dress 321 and the high heels 322) are completely worn on the virtual character 301. In practical implementation, the dress-change special effect means a visual effect such as occlusion, masking, transition animation, particle effect, shader, or visual transition that obscure certain parts of the virtual character 301 while the worn clothing is changed, thereby achieving transitional, hidden, or concealed visual effects.

Figure 4:
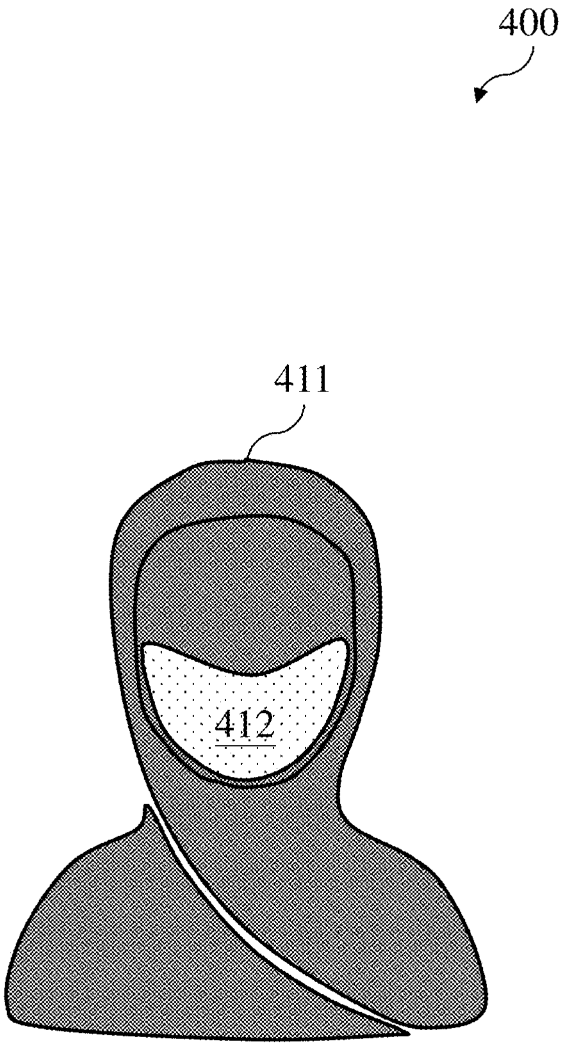
FIG. 4 is a schematic view of adjusting an accessory item worn on the virtual character based on an IP address, according to an application of the present invention.

Please refer to FIG. 4. FIG. 4 is a schematic view of adjusting an accessory item worn on the virtual character based on IP address, according to an application of the present invention. In practical implementation, in consideration of the religious beliefs and cultural aesthetics of different countries and regions, the computer host 120 can identify the viewer's country or region by detecting an IP address. When the detected country matches a specific country, such as Iran, Egypt, or Afghanistan, the computer host 120 loads appropriate accessory item from a clothing database 110, such as a turban 411 or a veil 412, based on the ethnic religious message and wears the accessory item on the virtual character 400, to ensure that the clothing of a virtual character 400 aligns with the religious and cultural aesthetics of different countries or regions. In an embodiment, the clothing items and the accessory items can be categorized by gender, that is, a male virtual character wears male-specific clothing items and accessory items, and a female virtual character wears female-specific clothing items and accessory items. It is particularly noted that the gender is taken as an example in the present invention, but the present invention is not limited thereto, for example, a male virtual character is allowed to wear female-specific clothing items and accessory items, and vice versa.

According to above-mentioned contents, the difference between the present invention and the conventional technology is that, in the present invention, the clothing items and the corresponding first musical element messages are stored, the pre-trained musical element recognition model is stored; initially, the computer host generates the virtual character that is allowed to wear the clothing item for display, and when the musical performance is detected, the music signal is continuously received, the music signal is input into the musical element recognition model to obtain the second musical element message corresponding to the music signal; the hardware processor loads the clothing item to be worn on the virtual character based on the comparison result of the first musical element message and the second musical element message, and continuously compares the difference between the second musical element messages at different times; when the difference exceeds a preset value, the clothing item worn on the virtual character is adjusted. Therefore, the above-mentioned solution of the present invention can solve the conventional problem and achieve the technical effect of improving the coordination between the music and the virtual character's clothing.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A dynamic clothing adjustment system based on musical element, comprising:

a clothing database, configured to store clothing items and first musical element messages, wherein each of the first musical element messages corresponds to one of the clothing items; and a computer host, configured to connect the clothing database, and comprising:

a non-transitory computer-readable storage medium, configured to store computer readable instructions, a pre-trained musical element recognition model, wherein the musical element recognition model is configured to receive a music signal, and output at least one second musical element message corresponding to the music signal; and a hardware processor, electrically connected to the non-transitory computer-readable storage medium, and configured to execute the computer readable instructions to operate:

generating a virtual character through 3D modeling technology and displaying the virtual character, wherein the virtual character is allowed to wear one of the clothing items;

when detecting that the virtual character performs a musical performance, continuously receiving a music signal and performing feature extraction, standardization and dimensionality reduction processing on the music signal, and inputting the processed music signal into the musical element recognition model to obtain the second musical element message corresponding to the music signal;

comparing the obtained second musical element message with the first musical element message in the clothing database, and loading one of the clothing items corresponding to the matching first musical element message and wearing the loaded clothing item on the virtual character; and continuously comparing a difference between the second musical element messages obtained at different times to obtain an difference element amount, when the difference element amount exceeds an preset amount, repeating the previous steps to replace the clothing item currently worn on the virtual character with the loaded clothing item, and during the process of wearing the loaded clothing item, generating an dress-change special effects to obscure the virtual character until the clothing item is worn is completed.

2. The dynamic clothing adjustment system based on musical element according to claim 1, wherein each of the first musical element message and the second musical element message comprises at least one of genre, rhythm, melody, harmony, and timbre, and selectively comprises an ethnic religious message as a condition for selecting the clothing item to be loaded.

3. The dynamic clothing adjustment system based on musical element according to claim 1, wherein the hardware processor loads pieces of music data and label messages as training data, wherein each of the label messages corresponding to one of the pieces of music data from a music database, and the hardware processor inputs the training data into an artificial intelligence model for training, to generate the musical element recognition model, wherein each of the label messages comprises at least one of genre, rhythm, melody, harmony, and timbre.

4. The dynamic clothing adjustment system based on musical element according to claim 1, wherein the hardware processor is configured to detect an IP address, and when the IP address matches a specific country, the hardware processor loads at least one accessory item from the clothing database, and wears the loaded accessory item on the virtual character, the accessory item comprises at least one of a turban, a veil, a scarf, a mask, and a hat.

5. The dynamic clothing adjustment system based on musical element according to claim 1, wherein the hardware processor is allowed to continuously capture images of the virtual character and share the captured images to a social media, when the difference element amount does not exceed the preset amount, the hardware processor is allowed to select any of the loaded clothing items and wear the selected clothing items on the virtual character.

6. A dynamic clothing adjustment method based on musical element, comprising:

connecting a clothing database to a computer host, wherein the clothing database stores clothing items and first musical element messages, each of the clothing items corresponds to one of the first musical element messages, and the computer host stores a pre-trained musical element recognition model, the musical element recognition model receives a music signal and outputs at least one second musical element message corresponding to the music signal;

generating a virtual character through a 3D modeling technology and displaying the virtual character, by the computer host, wherein the virtual character is allowed to wear at least one of the clothing items;

when it is detected that the virtual character performs a musical performance, continuously receiving a music signal and performing feature extraction, standardization and dimensionality reduction processing on the music signal, inputting the processed music signal into the musical element recognition model to obtain the second musical element message corresponding to the music signal, by the computer host;

comparing the obtained second musical element message with the first musical element message in the clothing database, loading one of the clothing items corresponding to the matching first musical element message, and wearing the loaded clothing item on the virtual character, by the computer host; and continuously comparing a difference between the second musical element messages obtained at different times to obtain an difference element amount, and when the difference element amount exceeds an preset amount, repeating the previous steps to replace the clothing item currently worn on the virtual character with the loaded clothing item, by the computer host, wherein during the process of wearing the clothing item, a dress-change special effects is generated to obscure the virtual character until the clothing item is worn completely.

7. The dynamic clothing adjustment method based on musical element according to claim 6, wherein each of the first musical element message and the second musical element message comprises at least one of genre, rhythm, melody, harmony, and timbre, and selectively comprises an ethnic religious message as a condition for selecting the clothing item to be loaded.

8. The dynamic clothing adjustment method based on musical element according to claim 6, wherein the hardware processor loads pieces of music data and label messages as training data, wherein each of the label messages corresponding to one of the pieces of music data from a music database, and the hardware processor inputs the training data into an artificial intelligence model for training, to generate the musical element recognition model, wherein each of the label messages comprises at least one of genre, rhythm, melody, harmony, and timbre.

9. The dynamic clothing adjustment method based on musical element according to claim 6, wherein the hardware processor is configured to detect an IP address, and when the IP address matches a specific country, the hardware processor loads at least one accessory item from the clothing database, and wears the loaded accessory item on the virtual character, the accessory item comprises at least one of a turban, a veil, a scarf, a mask, and a hat.

10. The dynamic clothing adjustment method based on musical element according to claim 6, wherein the hardware processor is allowed to continuously capture images of the virtual character and share the captured images to a social media, when the difference element amount does not exceed the preset amount, the hardware processor is allowed to select any of the loaded clothing items and wear the selected clothing items on the virtual character.

* * * * *